Sept. 12, 1961    F. HANDLER    2,999,718
SUN VISOR
Filed Sept. 17, 1959    2 Sheets-Sheet 1
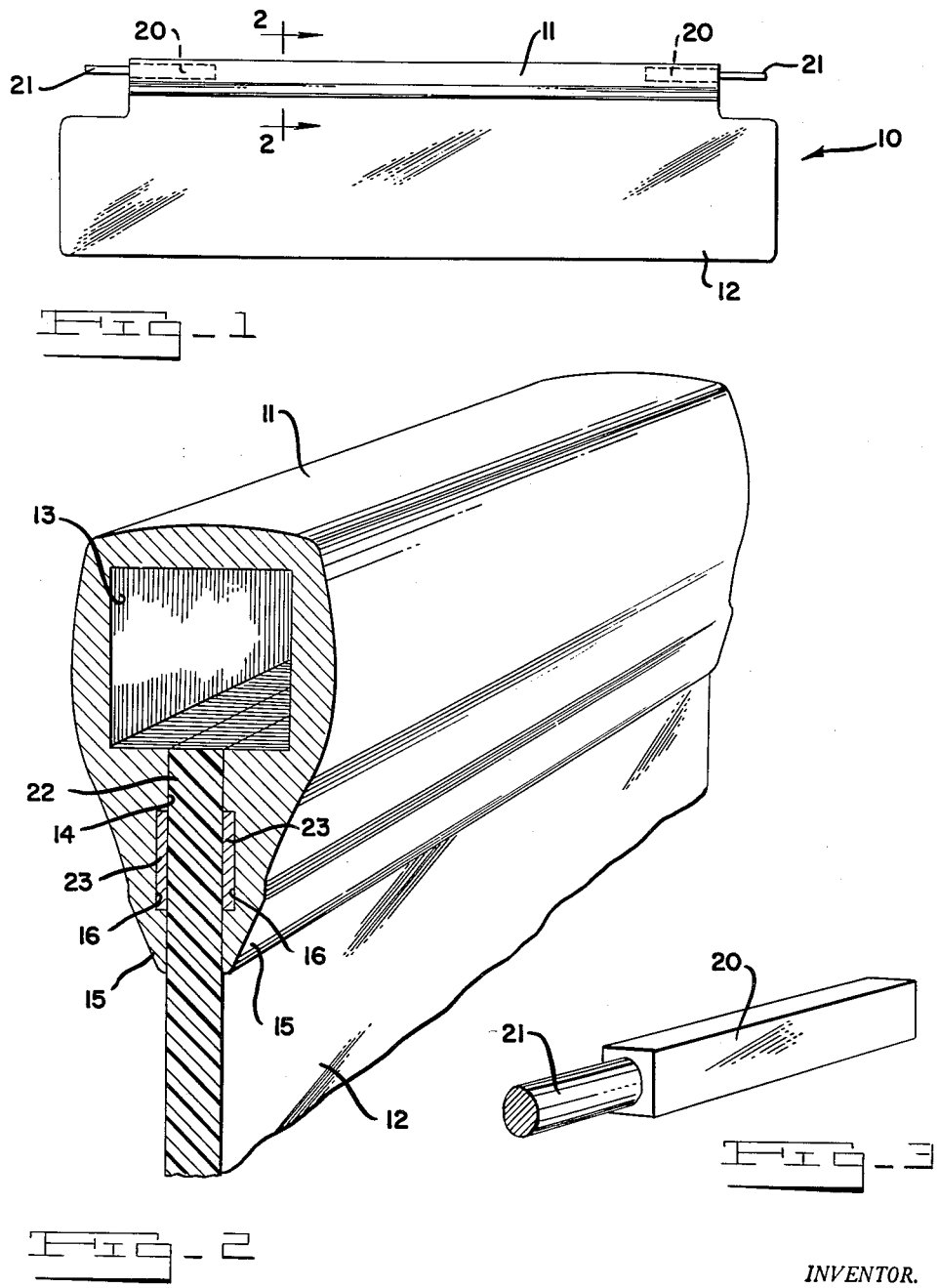
INVENTOR.
FRANK HANDLER
BY
Cullen & Cantor
ATTORNEYS Sept. 12, 1961 F. HANDLER 2,999,718
SUN VISOR
Filed Sept. 17, 1959 2 Sheets-Sheet 2

INVENTOR.
FRANK HANDLER
BY Cullen & Cantor
ATTORNEYS

United States Patent Office 2,999,718
Patented Sept. 12, 1961

2,999,718
SUN VISOR
Frank Handler, 1730 Wildemere, Detroit 21, Mich.
Filed Sept. 17, 1959, Ser. No. 840,586
2 Claims. (Cl. 296—97)

This invention relates to a sun visor and particularly to a visor adapted for use with automotive vehicles and arranged to be secured near the top of a windshield to screen the driver against sun and glare and to reduce the heat, within the vehicle, caused by the sun.

One object of this invention is to provide a simple, inexpensive visor made of only two parts, namely, a support strip and a single panel, both permanently joined together. with the fastening means being permanent, completely concealed, and protected against the elements and other damage.

Another object of this invention is to provide a sun visor with a highly attractive appearance, which visor is formed as a unit that is strong, rigid, cannot be disassembled once fabricated, and has a plastic panel which can be seen through, but which screens against ultra-violet and infra-red rays of the sun and also glare.

A further object of this invention is to provide a two part sun visor as mentioned above, with a simple, inexpensive clip connector means for connecting the visor upon a support shaft which means permits the visor to be rotated relative to the shaft axis and also slid longitudinally relative to the shaft axis.

Further objects and advantages of this invention will become apparent upon reading the following description of which the attached drawings form a part.

In these drawings:

FIG. 1 is an elevational view of the visor herein.

FIG. 2 is an enlarged perspective view taken in the direction of arrows 2—2 of FIG. 1.

FIG. 3 is an enlarged view of a support rod, per se.

Figure 4:
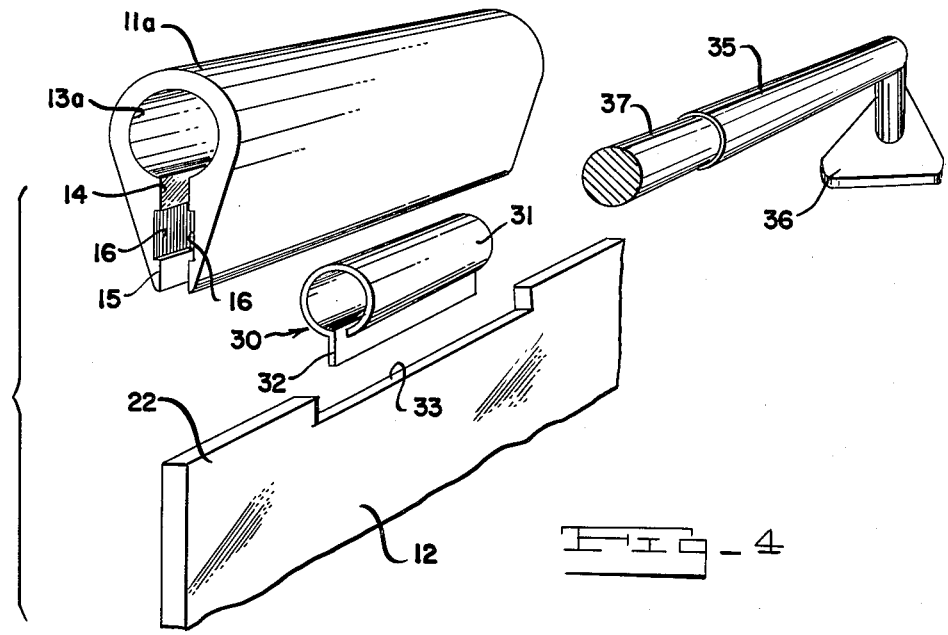
FIG. 4 is an enlarged perspective view of a modification, with the parts shown in disassembled relationship.

As shown in FIG. 1, the visor herein is designated as 10. It is formed of two parts, namely, support strip 11 and panel 12.

With reference to FIG. 2, it can be seen that the support strip is channel shaped in cross-section but with the base area of the channel (the top part in the drawings) being widened to form a tunnel 13, shaped to receive a support rod and extending the length of the strip.

The channel is narrowed at 14 so that the facing sides of the channel legs 15 are relatively close together, but are spaced apart a distance substantially equal to the thickness of a panel to be secured therebetween.

Also, each of the legs of the channel is provided with a groove 16, both grooves extending the full lengths of their respective legs. Each groove is shallow, but quite wide, so as to cover a considerable part of the legs 15 in the reduced channel area 14.

The tunnel 13 receives support rods 20, which, in this case, happen to be square in cross-section, and thus, the tunnel 13 is likewise square in cross-section to snugly receive the rod. As seen in FIG. 1, the rod is formed in two parts with each part extending a distance into the tunnel and each having an extending stud 21 arranged for fastening to a suitable bracket and hook support as is conventionally found in automotive vehicles. These brackets and support hooks are not shown since they form no part of this invention.

The upper or top edge 22 of the panel 12 is inserted into the narrow channel area 14 and is secured therein by means of a continuous filling of adhesive 23 in each of the grooves 16. The panel upper edge is snugly received in the channel 14 and is pushed therein after the adhesive is applied to the channels 16 so that the adhesive is not displaced during the assembly process. The adhesive bonds the legs 15 to the opposite faces of the panel 12. Thus, the panel is secured in place and cannot be removed. Moreover, the joint is completely concealed and cannot be tampered with and is protected against weathering, deterioration due to contact with the air, etc.

Preferably, the strip 11 is formed of a single extrusion of aluminum or the like light metal. It may be formed in a contoured outer shape with the legs tapering downwardly so that the legs are extremely thin at the mouth of the channel. However, the strip is rigid and strong, and is substantially non-flexible so that the two legs do not flex apart or together when the panel is inserted but merely snugly receive the panel.

The panel 12 is preferably formed of "Plexi-glas," a plastic more properly described as a methylmethacrilate. It is formed with the inclusion of certain chemical elements so that it is transparent and yet is color shaded in appearance and will absorb infra-red and ultra-violet rays of the sun and reduce glare substantially. The particular chemical composition of the panel forms no part of this invention but its characteristics are given above to more fully explain applicant's device.

In addition, the adhesive, while it may be of any number of different types, is characterized by first being capable of adhering plastic to metal, secondly not being effected by temperature and humidity changes and thirdly, retaining its bonding or holding power despite slight differences in expansion rates between the metal strip and the plastic panel due to varying temperatures. I have found that Minnesota Mining Co., No. E.C. No. 1375 adhesive is suitable for this purpose.

While the dimensions of the various parts forming this visor are by no means critical, for the purposes of illustration, a commercial model which I have made is provided with a strip which is approximately ½ inch wide at the top (as shown in FIG. 2) and about 3/16 inch wide at the bottom with the channel area 14 being the thickness of the panel which is approximately ⅛ of an inch thick and with the overall height of the strip being approximately ⅞ of an inch. The visor panel which is shaped to fit into one of the large size American model cars currently available on the market extends approximately 5½ inches beneath the strip and is approximately 22 inches long. The entire unit is rigid and strong and particularly is rigidified because of the strip which forms a backbone as well as a support strip for the panel.

Figure 5:
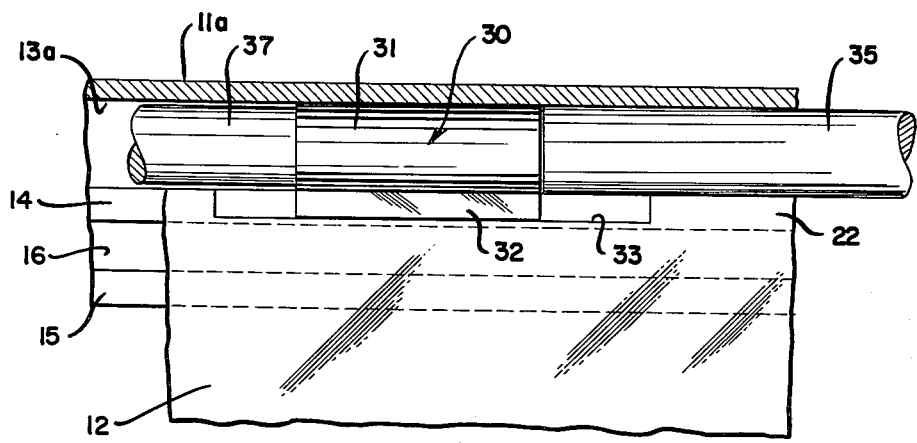
FIG. 5 is a cross-sectional view in elevation, showing the modification of FIG. 4, but with the parts assembled.

FIGS. 4 and 5 illustrate a modification wherein the visor is to be attached to an elongated support rod which is circular in cross-section. Hence, the strip 11a is provided with a circular tunnel 13a, the strip being otherwise exactly the same and having similar legs and grooves as that described previously.

In this case, it is desirable to make the panel with support strip 11a movable relative to the support rod. Hence, a connector clip 30 is provided. This clip is formed of thin, springy sheet metal which is bent into a circular bight 31 with a depending leg 32. The panel is notched at 33, preferably the notch being of considerably greater length than the length of the leg 32.

In use, the circular bight 31 is inserted into the tunnel 13a by pushing it into place against the opposition of friction. The leg 32 is positioned in the notch 33. Then, the support shaft 35 which is mounted upon a bracket 36, in turn secured to the vehicle body, is pushed into the tunnel 13a. Its reduced forward end 37 fits into the circular bight 31 and the dimensions of the bight, the tunnel and the reduced section 37 are such that the reduced section 37 tightly fits within the bight 31 while expanding it very slightly so that the bight 31 more tightly grips against the wall of the tunnel 13a. In this manner, a tight frictional engagement is provided. However, the frictional engagement is such that the strip 11a with its permanently attached panel 12 and the clip 30 may be rotated about the shaft 35. Likewise, the strip and panel may be slid axially upon the clip 30 and the shaft for a distance limited by the length of the notch 33. Also, the shaft may be pulled out of the clip 30 when the clip 30 engages the end of the notch 33 so that the entire visor with the clip may be removed from the supporting rod when desired.

This invention may be further developed within the scope of the following attached claims. Accordingly, it is desired that the foregoing description be read as being merely illustrative of an operative embodiment of this invention and not in a strictly limiting sense.

I now claim:

1. A sun visor compring an elongated, rigid, horizontally arranged support strip and a panel having a horizontally arranged, straight, flat top edge; said strip being in the form of a channel of uniform cross-section, with the channel opening downwardly, and the base portion of the channel being widened to form a uniform cross-section tunnel extending the lnegth of the strip and of a considerably greater width in cross-section than the thickness of the panel; the legs of the channel below the tunnel each having a flat vertically arranged interior face with said faces being parallel and spaced apart a distance substantially equal to the thickness of the panel for snugly receiving the panel top edge portion between them, said panel top edge portion being arranged between and in flat face to face contact with both of said faces with the top horinzontal edge of the panel extending to the tunnel and forming a continuation of the tunnel and closing off the gap in the tunnel formed by the intersection of the leg interior faces and the tunnel forming base portion; means for securing the panel to the strip, said means consiting of a horizontally extending groove formed in each of the flat interior faces of the legs and extending the full length of the strip, the grooves opening toward each other and being oppositely aligned, each of the grooves being substantially centered in the vertical direction relative to its respective leg, each groove being of a height which is approximately one-third of the height of its respective leg face and being shallow and in cross-section being substantially in the form of a narrow, vertically elongated rectangle having a vertical edge open; each groove being completely filled with an adhesive material which adhesive secures the panel top portion to both of the legs and which forms the only connection between the panel and the strip, said adhesive being positioned only in said grooves, whereby the means for securing the panel to the strip is permanent and is completely concealed and protected within the channel.

2. A construction as defined in claim 1, and wherein said tunnel is circular in cross-section; a circular in cross-section support rod snugly fitted into the tunnel through one end thereof, a portion of the rod within the tunnel being of a narrowed diameter relative to the remainder of the rod; and a connector means in the form of a thin, springy sheet metal strip bent into a circular bight and a depending flat leg, with the bight encircling the rod at its narrowed diameter and being in snug contact with the wall defining the tunnel and with the support rod, and with the leg depending below the tunnel, between the legs of the channel a short distance; the panel having a notch formed in its top edge; the notch being elongated horizontally and being of a depth to receive the connector leg, but being considerably longer than the connector leg in the horizontal direction, so that the panel and the strip may be pivoted as a unit around the rod and also may be moved longitudinally relative to the rod and connector within the limits of the side edges of the notch.

References Cited in the file of this patent

UNITED STATES PATENTS

| 598,827 | Tracy | Feb. 8, 1898 |
| 2,095,715 | Rhein | Oct. 12, 1937 |
| 2,284,784 | Westrope | June 2, 1942 |
| 2,340,015 | Pelcher et al. | Jan. 25, 1944 |

FOREIGN PATENTS

| 328,554 | Great Britain | Apr. 23, 1930 |
| 1,123,335 | France | June 11, 1956 |